Oct. 11, 1966

W. L. JOHNSON ET AL 3,278,027

GRIT RECLAMATION METHOD

Original Filed May 23, 1961

INVENTORS.
ROBERT G. MILLHISER
NICHOLAS J. PANZICA
WILLARD L. JOHNSON

FIG. 3
FIG. 4
FIG. 5
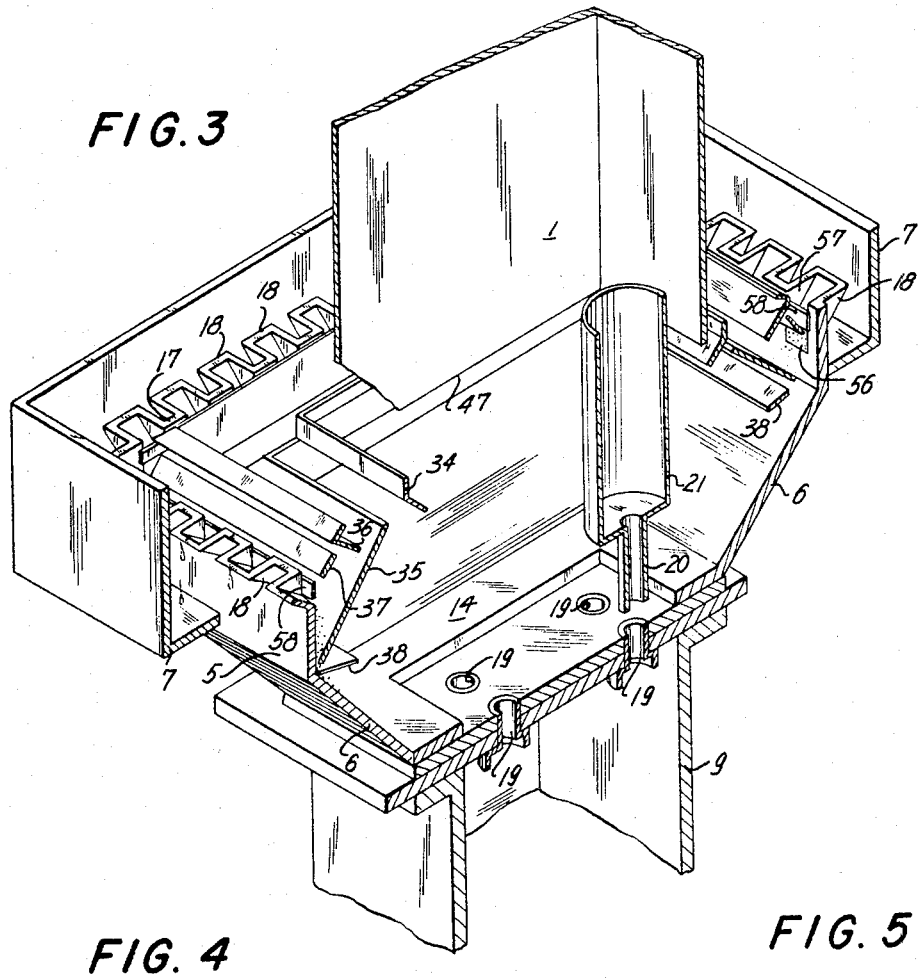
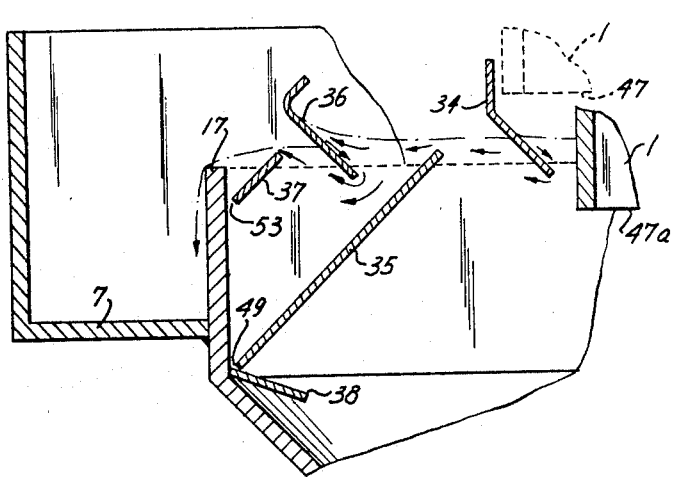
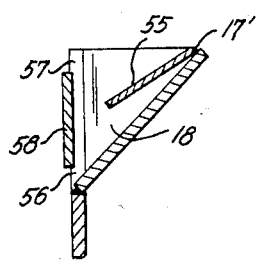
INVENTORS.
ROBERT G. MILLHISER
NICHOLAS J. PANZICA
WILLARD L. JOHNSON

United States Patent Office 3,278,027
Patented Oct. 11, 1966

3,278,027
GRIT RECLAMATION METHOD
Willard L. Johnson, Southfield, and Robert G. Millhiser and Nicholas J. Panzica, Detroit, Mich., assignors to Ajem Laboratories, Inc., Livonia, Mich.
Original application May 23, 1961, Ser. No. 125,609, now Patent No. 3,122,863, dated Mar. 3, 1964. Divided and this application May 24, 1963, Ser. No. 282,986
3 Claims. (Cl. 209—155)

This application is a divisional of our pending application Serial No. 125,609, filed May 23, 1961, now Patent No. 3,122,863, dated March 3, 1964.

This invention relates to methods for separating unwanted fine particles, dirt, etc. and excess liquids from suspension carrying particulate solids, and to the processes of such separation.

More particularly, this invention relates to deburring and abrading apparatus and processes of the type wherein smoothing, trimming, or, in general, surface reforming of manufactured parts is effected by hard particles entrained in high velocity liquid streams. Apparatus of this general type for deburring, peening and/or abrading is shown, for example, in the copending Emil Umbricht et al. patent application U.S. Serial No. 9,910 filed on February 19, 1960, now Patent No. 3,150,467, dated Sept. 29, 1964. For sake of brevity we shall refer to such hard particles, whether sharp abrasive grains or smooth shot or smaller particles, etc., for surface reforming by the term "grit."

As fully described in our coworkers' above-identified Patent No. 3,150,467, the grit is suspended in a liquid medium contained in a hopper-like tank, or "sump," conveniently positioned. The grit gravitates toward the bottom of the sump gradually being concentrated to a slurry; and there it is entrained in an ejector by the action of a liquid jet and thus accelerated upward through a blast tube, extending to the surface of the liquid mass and is directed into a blasting chamber and against the manufactured part positioned therein.

Because high pressure liquid jets are used to drive the grit against the surfaces being treated, and for washing away residual grit from the parts and the apparatus, it is necessary to separate excess liquid before re-using the grit. Moreover, since the treatment with the grit knocks and scrapes off from the treated parts small pieces and particles of metal, mold or core sand, scale, dirt, etc., these are with the liquid which drain back from the blasting chamber. Also slimes, oils, colloidal particles, detergents and surface coating materials of various kinds are scoured off from the parts during treatment and washed away in the drain-back. All these things complicate the separation problem, and some of them have flotation effects which tend to carry off in foam valuable grit which is desired for re-use.

It is, of course, desirable to collect the drain-back directly as it falls from the part being treated and the chamber around it; but since washing and separation of the grit are necessary, the recovered material has had to be taken off for such treatment. When the grit used is abrasive, every transfer of this kind which requires pumping or rapid movement is a source of deterioration of the apparatus and the grit.

The present invention is concerned with improving the method for reclaiming and returning the grit for re-use. It is particularly concerned with a method for separating, reconditioning and returning the grit, which will be so efficient and compact that those functions can be accomplished in the zone beneath the blasting zone.

With this object in view, we provide a liquid-return system having a sump, sloping surfaces leading to the sump, and weir edges, all located to collect the drain-back material, i.e., the entraining liquid, the grit, and superfluous matter. The drain-back into the sump creates an overflow; and we control the conditions of the overflow so that it effects a separation of waste matter, with superfluous liquid, from the grit and a part of the liquid, which are retained in the sump and re-used. To this end we provide a level weir edge around the sump, of such length as to limit the depth and velocity of the overflow. Thus we carry off the finer dirt and waste. Advantageously, we also provide baffles adjacent to the weir to control the flow to the weir in such geometrical design and arrangement that substantially only the excess liquid and waste solids reach the weir for overflow, while the less readily suspended solids remain to settle in the sump and serve as surface reforming grains for further operation of the process.

Because of its more rapid settling rate and the design of our apparatus, the grit is below the depth of the weir edge in the overflowing liquid before it reaches the weir edge and therefore continues to settle into the sump. Thus the supply of suitable surface reforming grains in the sump is continually replenished by this drain-back material, and is continually cleaned of unwanted material. The action just described is related to velocity of flow of liquid across the sump to the overflow edges and especially its velocity at the weir edge.

We have found that efficient reclaiming and re-use of grit in such operations requires overflowing the excess liquid uniformly along a sufficient weir length to keep a uniformly shallow depth and low velocity of flow in the escaping liquid, whereby to insure a positive separation of the solid matter to be retained in the apparatus for re-use, but to carry off the dirt.

An object of this invention, therefore, is to provide a rate and depth of overflow of the excess liquid over a weir edge which, with due regard for any turbulence introduced within the body of liquid will provide for washing off the dirt and settling back the granular blasting material suitable for re-use. Because of the velocity of liquid flow required for effective wet blast treatments, this separation requires an increase in the length of weir edge beyond that of a suitable sump or storage tank. It is an object of our invention to provide this length without excessive increase in size and cost of the apparatus.

Another object of this invention is to condition the flow of excess liquid toward a weir edge so as to favor sedimentation of the heavier matter suspended therein.

Accordingly, we have set forth below an embodiment of our invention wherein we achieve these objects by a novel weir and advantageously with a novel baffle system each of which affords striking improvement and which together combine to give extraordinary efficiency and effectiveness in operation. In accordance with one aspect of this invention, a baffle arrangement is positioned adjacent to and within the weir edge around that portion of the sump into which the drain-back material is received. This baffle arrangement functions, in effect, to control turbulence in the vicinity of the weir and to introduce local flow patterns which facilitate separation of suspended solids. Thus the excess liquid is conditioned so as to overflow uniformly along the entire length of the weir and the desired separation of matter suspended therein is effected. Also, this excess liquid as it flows through the novel baffle arrangement toward the weir, undergoes abrupt changes in flow direction whereby the sedimentation of suspended matter therein is accelerated.

To control the overflow rate of the excess liquid so as to gauge the line between separation and retention of the suspended solids, a series of pocket-like extensions are provided along the weir edge which both increase the effective weir length of the system and provide quiescent bodies of liquid adjacent these extended edges. These pocket-like extensions may be in open communication with the body of liquid, but we find it advantageous to have baffles between to keep any rapid flow away from the weir edge, e.g., to allow liquid to enter into these extensions well below the weir level and to fan out to the edges. The weir edges of the pocket-like extensions are disposed in the same plane as the weir edges between them so as to be in effect continuous therewith, whereby the excess liquid overflows uniformly and at a reduced rate along the effective weir length. Accordingly, the sedimentation rate of the suspended matter is increased and also the velocity of the overflow liquid is uniformly reduced along the effective weir length; and the efficiency of reclaiming the grit is greatly increased.

In this specification and the accompanying drawings we have shown and described a preferred embodiment of the invention and certain modifications and alternatives; it will be understood, however, that these are given for purposes of illustration in order that others skilled in this art may fully understand the invention and the principles thereof and its application to practical use so that they can modify it and adapt it in various forms, each as may be best suited to the conditions of the particular use.

In these drawings:

FIGURE 3 is a fragmentary isometric sectional view of an apparatus embodying this invention;

FIGURE 4 is a detail view in section taken along the line 4—4 of FIGURE 2; and

FIGURE 5 is a sectional view of one of the pocket-like extensions in accordance with this invention.

Figure 1:
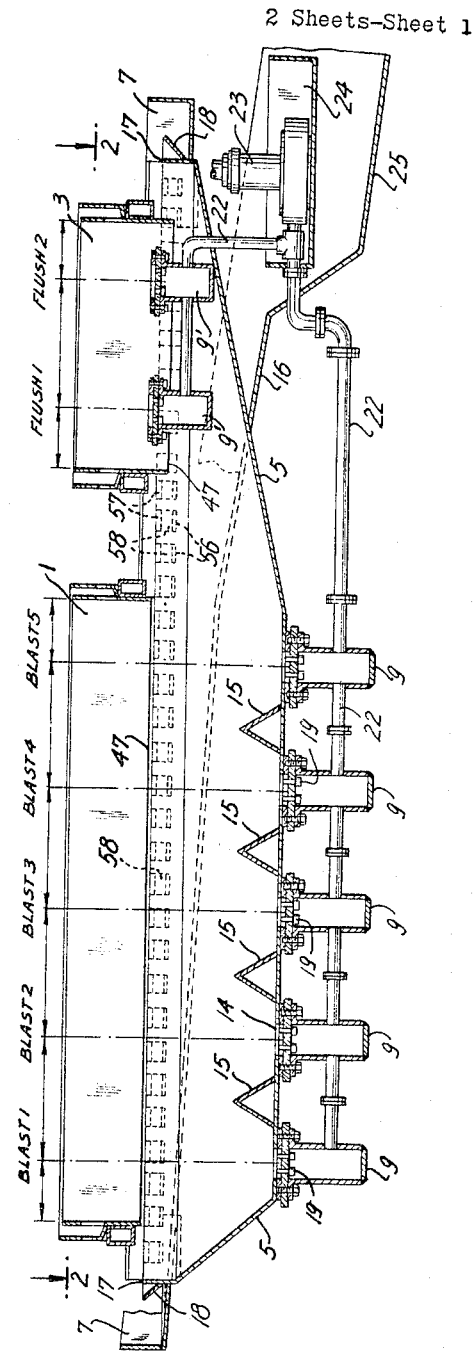
FIGURE 1 is a view in longitudinal vertical section taken on line 1—1 of FIGURE 2.

Referring to these drawings, the apparatus shown comprises a blasting chamber 1 and flushdown or washing chamber 3 for deburring parts transported longitudinally therethrough by conveyor means, not shown. In the blasting chamber 1 indicated in FIG. 1 such manufactured parts are treated for surface re-forming by the impingement thereon of surface-reforming grains entrained in high velocity liquid streams. The flushdown chamber 3 is adapted for washing the part, after such surface treatment, by high velocity, clear liquid streams to remove any residues from the blasting treatment, e.g., surface reforming grains, mold material, core sand, loosened scale or flakes, etc. The present invention makes it feasible to return to the sump 5 the wash liquid and the grit thus washed off, and thus to reclaim the grit and to utilize the excess wash liquid to clean the reclaimed grit.

The parts to be thus treated are carried successively through the blasting chamber 1 and the flushdown chamber 3. For example, the individual parts may suspend from an endless chain conveyor extending through these chambers.

A water-shed under the blast and wash chambers 1 and 3 comprises a sump 5 which serves as a settling tank e.g., of rectangular shape, and a sloping gutter 7. The sump 5 is made of a number of plate members welded at their edges, or otherwise joined, so as to converge downwardly in hopper-like fashion toward a number of blasting manifolds 9; and the gutter 7 is likewise formed of plates joined at their edges to the edges of sump 5.

The blasting manifolds 9 are affixed to a base plate 14 of sump 5. Pairs of inner plate members 15 are angularly positioned in the base of sump 5 and joined to each other and to the sloping sides of the sump, e.g., by welding abutting edges so as to complete hopper-like sections for each of the blasting manifolds 9. The blasting manifolds 9 are disposed beneath the blasting chamber and one end 16 of the water-shed extends beneath the flushdown chamber 3.

Each manifold 9 is provided with several jet orifices or nozzles 19; and alined above these, respectively, are the blast tubes 20 which, combined with the nozzles 19, constitute an eductor to suck in the settled slurry from the bottom of the sump and entrain it in the high velocity jet from nozzle 19. The spacing between blast tube 20 and nozzle 19 is adjusted to give the desired eductor action. The resulting blast is protected from the liquid in sump 5 by blast tube 20 with any extension thereof, as desired, such as the casing 21. A liquid-conduit system, for supplying clean liquid under pressure to the manifolds 9 is illustrated at 22. This system comprises a pump 23 connected through the respective manifolds 9 with the blasting nozzles 19. The pump 23 ordinarily is a high pressure, high capacity pump and is immersed in a clear liquid storage tank 25.

A second branch of the liquid conduit system 22 goes to the manifolds 9' for the washing jets 29 in the flushdown chamber 3. These jets are directed against articles positioned in the path of the jet after blasting with grit in chamber 1. The run-back from this wash falls into the end portion of the sump where any grit and heavier particles washed back gravitate toward and along its sloping bottom. A rim 17 on sump 5 and on pocket-like appendages 18 serves as an overflow weir with its extensive edge all at one level.

If enough peripheral space is provided in the sump to bring the liquid to a quiescent flow and allow the grit to settle out before it reaches the vicinity of the weir 17, a simple weir edge on the tank could be sufficient, but by the present invention, the area requirement for such settling is greatly reduced and efficiency increased.

In accordance with the principles of this invention, a baffle structure is arranged about that portion of the sump into which the drain-back material is received. This baffle structure, as shown, comprises a plurality of angularly related flat members 34, 35, 36, 37 and 38 secured in the peripheral part of sump 5. The baffles 34, 35, 36, 37 and 38 are alternately inclined so that each is directed toward, and substantially perpendicular to the plane of, the next outwardly-adjacent baffle. In addition, the upper edges of the baffles 35 and 37 extend a little above the weir level, while their lower edges extend sufficiently below the weir level to assure that the liquid level between these baffles will overflow the upper edges at a level above that of the weir. The effect of these baffles is that the liquid flowing outwardly is forced to overflow the baffles 35 and, in doing so, tends to deflect downwardly the grit particles, which have radial momentum tending to carry them outwardly as the liquid rises. Again at the baffle 36, both the liquid and any entrained particles tend to flow up onto the ramp surface of 36. The upper edge of 36 is formed as a lip to prevent the liquid from overflowing. As this liquid laps up on the ramp, like tidal water rising on a beach, it creates an undertow flowing back down the ramp and this again gives a momentum to entrained grit particles, which tends to throw it down onto the upper surface of the baffle 35, while the liquid again reverses its flow and rises between baffles 36 and 37. At 37 again, as at 35, the radial momentum of any entrained grit particles carries them against the sloping underside of the baffle and thence downward, while the liquid overflows the top edge of the baffle 37 and eventually runs on over the weir edge 17.

The lower edges of the members 34 and 36, on the other hand, extend to a lesser depth below the weir level and at an angle directed downwardly into the flow, thus functioning as a skimmer device to skim off any foam, and hold it in contact with the flowing liquid and give it opportunity to break and drop any grit which it has floated. These multiple baffles at the surface of the liquid also smooth out any waves which might be formed by the blasting action and which, if not intercepted, might cause irregular overflow.

The upper edges of the members 34 are juxtapositioned with, and extend slightly above the level of, the lower edges 47 of the blasting chamber 1 and, likewise, of flushdown chamber 3. Thus, the inner rectangular baffles 34, in effect, form a pyramidal bottom section on the blasting chamber 1 and the flushdown chamber 3, extending below the weir level. This allows room for the baffles 34–37 with lesser overall dimensions of the sump 5. The baffles 34 may, however, be outside the walls of chambers 1 and 3, especially if the chamber wall is extended downward so that its bottom edge 47a is below the liquid level in the sump. This is shown for example in FIGURE 4, in which the position of the bottom of 47 in the other figures is indicated by broken lines for comparison.

The baffle 35 is spaced at its lower edge from the peripheral wall of sump 5, leaving a narrow passage 49 which need only be large enough to pass the normal flow of excess liquid and waste solids carried thereby.

The internal baffle 38 positioned beneath the passage 49 gathers the liquid flow to the outlet passage 49 and protects against a turbulent washing of the sloping wall 6 onto which grit may have settled.

In the operation of the device shown and described above, the sump 5 is filled with a suitable blasting and washing liquid, for example, water or an aqueous solution of surface treating chemicals, such as detergents, rust inhibitors, passivating agents, defoamants and the like. The grit, e.g., malleable iron grit of the grade known in the trade as G40, is dumped into the sump so that it settles into the bottom areas around the jets 19. With the articles to be treated suitably supported over the blast tubes 20–21, the pump 23 is operated to supply the liquid under relatively high pressure to the manifolds 9. This liquid, escaping through nozzles 19, entrains the grit by ejector action into a blast directed up through the blast tubes 20 into the chambers 1 and against the articles being treated. Likewise in chamber 3 a jet of the liquid is directed against the articles held above it, which have already been treated by the grit blasting in chamber 1.

The liquid and grit fall back from this treatment into the sump 5, carrying with it a certain amount of dirt, sand, scale, oil, etc., removed from the surfaces of the articles being treated. As this fall back material includes excess liquid used in the flush chamber 3, there must be an overflow equal to the excess. If this were merely allowed to overflow the edge of a simple rectangular sump, the overflow velocity would carry grit over the edge with the waste liquid with resulting nuisance in the disposal facilities and expense for replacing it with fresh frit. A larger sump reduces the velocity of the overflow, but such large sumps are expensive in themselves and occupy expensive plant area.

In the preferred embodiment illustrated this rate of flow is attained by increasing the length of weir edge by making a tortuous form as a result of the numerous pocketlike extensions 18, each about a four inch square. Wider shallow pockets can be used where less weir length is required and narrow, longer and deeper pockets where greater length of weir is needed. Sinuous weir edges can be provided instead of such rectangular tortuous form, or a meandering edge or saw-tooth form.

The liquid flowing from the central area in the example shown, within the baffle 34 toward the weir edge 17 must first pass under the innermost baffle 34 (and also under the bottom edge 47a of the chamber 1, if it is arranged as shown in full lines in FIG. 4), then it spreads radially and upward into the space beyond the baffle 34 from which the liquid overflows the top of baffle 35. Entrained grit, however, which has greater momentum in the radial direction, will tend to strike and be deflected downward by the lower surface of the baffle 35 meanwhile gradually settling through the liquid toward the bottom of the sump 5.

It will be noted that the liquid level as it overflows the baffle 35 is higher than the weir level, i.e., the reversal of flow which occurs and the very narrow gap at the bottom of baffle 35 are sufficient to hold back the liquid until it reaches a substantial head.

Beyond the baffle 35 the liquid again spreads out radially and downwardly. Some of the entrained grit particles settle onto the top surface of 35 and into the area between the bottom edge of 36 and the top of 35. Another portion of the grit is carried up over the sloping face of baffle 36 where it laps the surface and turns back down to create an undertow, so that at the bottom of the baffle 36 the liquid and entrained grit particles are flowing toward the baffle 35. Thus the entrained particles are again given a momentum causing them to travel downward toward baffle 35 and along its surface while the liquid again reverses its flow to spread upwardly and outwardly in the area between baffles 36 and 37. Here again, as with baffle 35, the outward momentum of entrained grit tends to carry it against the underside of baffle 37, where it is deflected downwardly and settles toward the slot 49 at the bottom of baffle 35, while the liquid overflows baffle 37 and falls into the final settling area between baffle 37 and the weir 17 and eventually overflows into the trough 7. Here again the diversion from the flow down along the top surface of baffle 37 to overflow the weir 17 causes any remaining entrained grit to be carried by its momentum toward the slot 53. The grit collects first in the trough formed by baffle 37 and then in the trough behind baffle 37 and gradually settles through slots 53 and 49 and along baffle 38 and down into the sump.

In a preferred example as set forth, the lower edge of the baffle 35 is ⅛ inch from the vertical peripheral wall of the sump and ¼ inch from the top of the baffle 38. In this instance, the baffle 38 is about 30° above the sloping bottom 6 of the sump 5 and about 20° downward slope from the horizontal. Baffle 38 in this instance is about 3" wide, baffle 35 about 10" wide, baffle 36 about 3½" wide and baffle 37 about 2¼" wide. 34, 35, 36 and 37 all slope at about 45°.

The gap 49 is dimensioned to restrict the flow therethrough so as to avoid washing upward from the gap. Thus, the outward flow causes a small rise in the liquid level at the upper edge of the baffle 35 and likewise with the baffle 37. This results in a thin layer of the lightest liquid (i.e., that most free from the grit), overflowing the upper edges of these baffles. The intermediate baffles 35 and 36 force reversals in the direction of flow as described above so as to increase the separating action.

Figure 2:
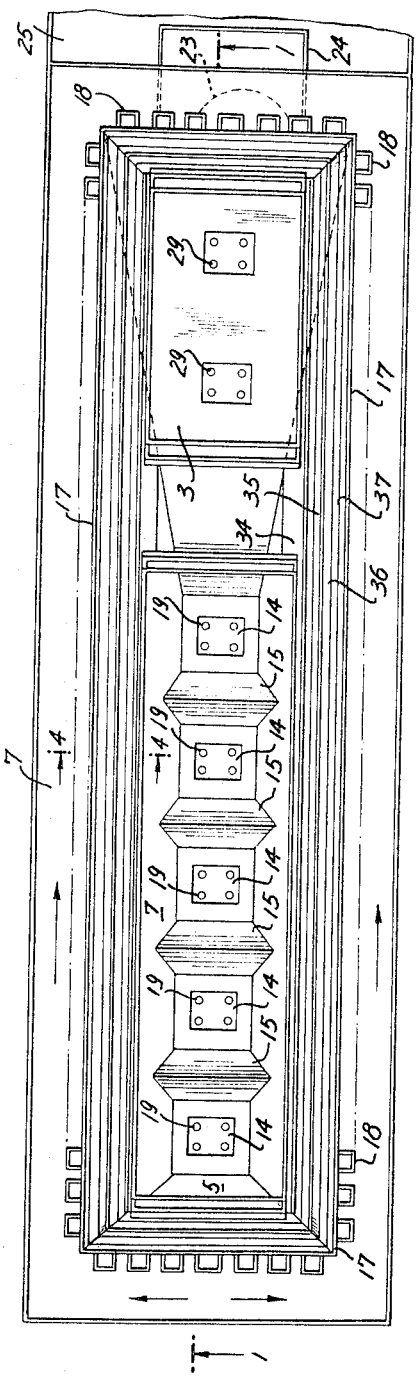
FIGURE 2 is a view in horizontal section taken on line 2—2 of FIGURE 1.

The grit used for surface-reforming is normally suspended in a liquid in the sump 5. Due to the hopper-like configuration of the sump, the grains of the grit gravitate toward an eductor device consisting of the jets 19 and blast tubes 20–21, by which they are entrained in the high velocity liquid streams emanating from the nozzles 19 and blasted against the articles held above in chamber 1. The larger section 21 of the blast tubes serves to hold back the liquid i nthe sump and keep a space for the blast to pass without interference. Liquid is directed under pressure to each of nozzles 19 and 29 in jet-like fashion. (The blast tubes 20–21 are omitted from FIGURES 1 and 2 for clarity, but one shown in FIGURE 3.)

Accordingly, the grit impinges on the articles positioned in, or being transported through, the blasting chamber 1, with sufficiently high energy to effect the desired reforming process.

During operation, solid mater suspended in the flow-back liquid is continuously settling out at a rate which is a function of its size, density, and other characteristics. The sedimentation rate of the suspended matter, however, is advantageously increased by flowing the excess liquid through the novel baffle arrangement and thus subjecting it to abrupt changes in flow direction which are transverse to its normal, lateral flow pattern toward the weir edge 17. For example, on passing beneath each of the members 34 and 36, the solid matter suspended in the excess liquid is impelled downward below the weir level and, when the liquid has to flow upward and over the members 35 and 37, the solids tend to continue downward due to their inertia added to gravitational forces, so that they are well below the weir when the liquid, after the same lateral travel, approaches the weir edge 17. Any suspended grit which may pass the baffles 35 and 36 is deflected downward by the member 37 and through the gap 49 between the member 35 and the wall of sump 5.

During the reforming process, the grains of the grit are eventually worn down or shattered from the violent impacts and abrasion against each other and the parts being treated. According to this invention, however, a uniform reforming of the parts continues, because the surface reforming grit, when worn down or shattered so far as to be no longer suitable for the reforming process is removed from the blasting liquid.

The articles after blasting in chamber 1 pass on through the flushdown chamber 3 where the surface of each part is washed clean by high velocity streams of clear liquid directed through the nozzles 29 on the flushdown manifolds 9'.

Due to the "breakwater" action of the baffle arrangement, the overflowing liquid has been brought to a quiet uniform flow condition so that it overflows uniformly along the entire tortuous edge 17 of the weir. The excess liquid with the more readily suspended matter carried thereby after passing over the weir edge 17 flows along the trough 7 to the settling tank 25, from which a clear liquid overflows into the tank 24 around the pump 23.

As already mentioned above, the depth and rate of flow of the excess liquid flowing over the weir edge 17 is reduced by extending the weir edge with a series of pocket-like extensions 18.

These are most economically made by notching or castellating the upper edge of sump 5, and welding onto the outside face and about each such notched position the triangular pocket structure 18. The weir edges 17' of the pocket-like extensions 18 are disposed in the same plane as the rest of the weir edge 17 and are continuous with those portions of the weir edge 17 disposed therebetween. It is evident that, if desired, the pocket-like extension may be disposed along the inside face and about the notched portions to secure the same result.

In order to provide for controlled flow into the pockets 18 (see FIGURE 5), a slot 56 is provided at the bottom and the notch is left open at the top, as shown at 57. The wall 58 between may be a part of the originally formed sump tank 5, which is merely sloted at 56 and 57; but it is ordinarily more economical to cut a full notch for the pocket 18 and then weld a strip 58 over the opening, spaced top and bottom as shown.

As a final precaution against overflow of valuable grit, a baffle 55 may be provided, as illustrated in FIG. 5, functioning in much the same way as baffle 38.

If suspeended solids which should have been retained in the sump should enter the pocket 18, they gravitate downward toward and through the slit 56 which communicates with the baffled area inside the periphery of the sump, and there settles toward and through the gaps 53 and 49.

Thus, it will be seen that the incorporation of the novel baffle and weir system of this invention with hydraulic classification system of the instant type provides for a positive separation of the solids which should be retained, and with accurate gauging. Due to the smooth quiet flow of the excess liquid to the weir edge 17 loss of grit due to turbulence is avoided. Moreover, as the effective weir length of the shed system can be varied by design of the pocket-like extensions 18, this action can be adjusted to the requirements of different grits and different input volumes of excess liquids.

We claim:
1. The method of hydraulic classification of reusable solid particles from waste matter which comprises collecting a suspension in liquid of said solid particles and waste matter in a zone of a predetermined size, settling said solid particles into the bottom of said zone from which they may be withdrawn for reuse quiescently overflowing excess liquid from said zone together with slower settling waste matter from a multitude of adjacent peripheral areas in a plurality of divergent directions from each area over a linearly extended, substantially horizontal, tortuously shaped, boundary occurring at the top outer periphery of said zone, whereby a more effective skimming overflow from said zone is accomplished.

2. The method as defined in claim 1 which further comprises collecting said liquid suspension from above into said zone at a central area within said weir edge, blocking the flow of all liquid, particles, and material along the upper surface of said zone toward said weir edge from said central area to cause it all to flow down into said zone for a distance whereby reusable particles are more readily separated from such surface flotsom.

3. The method as defined in claim 2 which further comprises while flowing the liquid from said central area to the edge of the zone, in sharply diverting its direction flow from upward to downward slope and vice versa several times, whereby to accelerate settling of solids toward the bottom of said zone.

References Cited by the Examiner
UNITED STATES PATENTS

| | | | |
|---|---|---|---|
| 1,333,287 | 3/1920 | White | 209—155 |
| 1,512,561 | 10/1924 | Oliphant | 209—273 X |
| 1,702,203 | 2/1929 | Day | 51—8 |
| 2,200,587 | 5/1940 | Tirrell | 51—8 |
| 2,591,830 | 4/1952 | Klepetko | 209—208 X |
| 3,140,259 | 7/1964 | Kelly | 210—525 X |
| 3,150,467 | 9/1964 | Umbricht et al. | 51—8 |

FRANK W. LUTTER, *Primary Examiner.*

HARRY B. THORNTON, LESTER M. SWINGLE,
*Examiners.*